US010650646B2

(12) United States Patent
Allen et al.

(10) Patent No.: US 10,650,646 B2
(45) Date of Patent: May 12, 2020

(54) METHOD OF INCREASING DETECTION ZONE OF A SHADOW-BASED VIDEO INTRUSION DETECTION SYSTEM

(71) Applicant: ILLINOIS TOOL WORKS INC., Glenview, IL (US)

(72) Inventors: Roy Allen, North Andover, MA (US); Stephen McMahon, Quincy, MA (US); Zachary Harvey, East Weymouth, MA (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 16/210,547

(22) Filed: Dec. 5, 2018

(65) Prior Publication Data

US 2020/0027324 A1    Jan. 23, 2020

Related U.S. Application Data

(60) Provisional application No. 62/595,134, filed on Dec. 6, 2017.

(51) Int. Cl.
*G08B 13/16*   (2006.01)
*G08B 13/196*   (2006.01)

(52) U.S. Cl.
CPC ...  *G08B 13/1645* (2013.01); *G08B 13/19615* (2013.01); *G08B 13/19695* (2013.01)

(58) Field of Classification Search
CPC .......... G08B 13/1645; G08B 13/19615; G08B 13/19695; G08B 13/1961; G08B 13/1895; G08B 13/194; G08B 13/18
See application file for complete search history.

(56) References Cited

U.S. PATENT DOCUMENTS

2008/0240577 A1* 10/2008 Aartsen ................. H04N 7/181
382/218

FOREIGN PATENT DOCUMENTS

| EP | 0913794 | 5/1999 | |
| EP | 1598792 | 11/2005 | |
| EP | 2819109 | 12/2014 | |
| EP | 2819109 B1 * | 5/2015 | ......... G06K 9/00201 |
| EP | 3421191 | 1/2019 | |
| WO | 2016/044375 | 3/2016 | |

OTHER PUBLICATIONS

International Search Report issued in PCT/US2018/064167 dated Mar. 4, 2019.

* cited by examiner

*Primary Examiner* — Steven Lim
*Assistant Examiner* — Mancil Littlejohn, Jr.
(74) *Attorney, Agent, or Firm* — McCarter & English, LLP

(57) ABSTRACT

This disclosure relates to method of enhancing the three-dimensional detection range of a vision-based, single camera intrusion detection system within a tensile test machine or other materials testing machine. Illumination sources are offset from the camera and provide a cones of illumination which intersect with the conical viewing zone of the camera thereby defining a detection zone. When objects intrude into these conical regions, a shadow is cast. The shadow is detected by the camera. The detection of the intrusion is typically used as a safety function to deactivate at least part of the function of the materials testing machine.

11 Claims, 7 Drawing Sheets

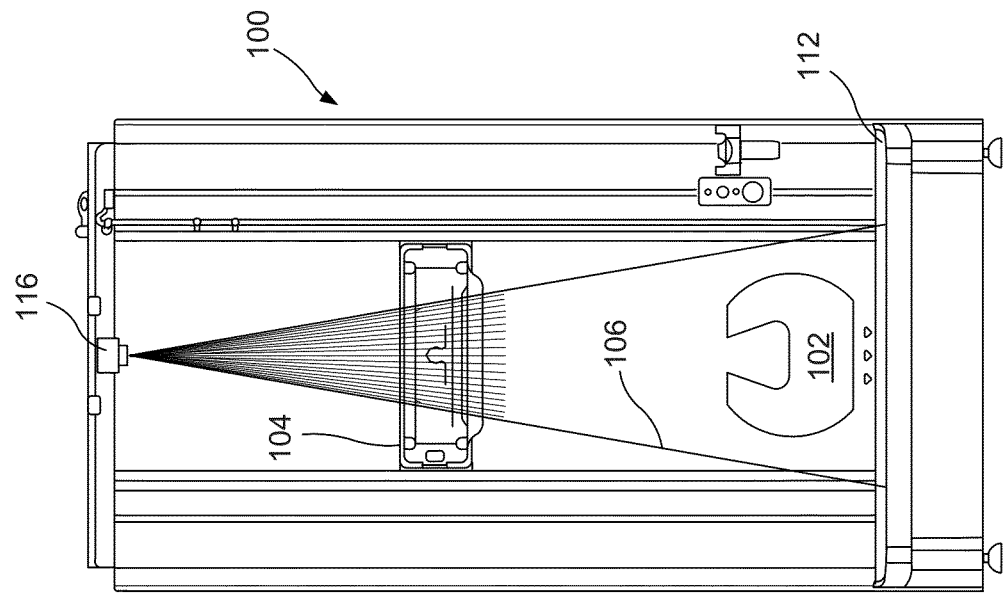
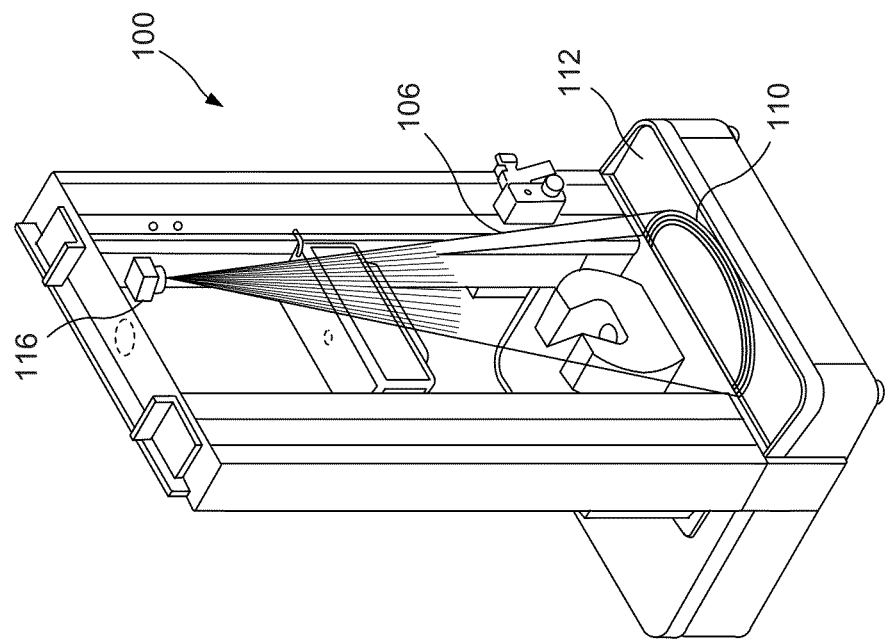

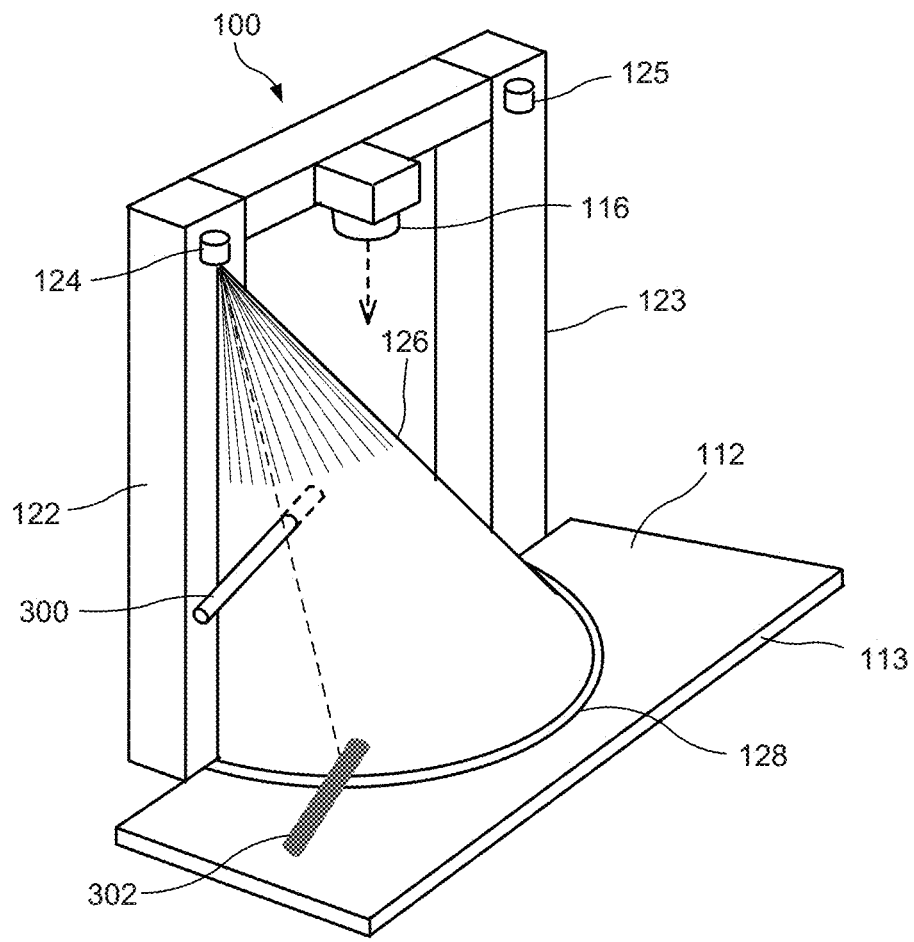
F I G. 5

METHOD OF INCREASING DETECTION ZONE OF A SHADOW-BASED VIDEO INTRUSION DETECTION SYSTEM

This application claims priority of U.S. Provisional Application Ser. No. 62/595,134, filed on Dec. 6, 2017, the contents of the disclosure of which are incorporated by reference herein for all purposes.

BACKGROUND OF THE DISCLOSURE

Field of the Disclosure

This disclosure relates to method of enhancing the three-dimensional detection range of a vision-based, single camera intrusion detection system, typically used in conjunction with a materials testing device, without adding the extra cost and complexity of utilizing multiple cameras.

Description of the Prior Art

A vision-based intrusion detection system uses a video camera to observe an area that is to be protected. The intrusion detection zone is typically defined by a boundary that presents high visible contrast to the camera relative to background objects such as, for example, an adjacent pair of black and white lines. The camera continuously monitors this boundary for any changes. Any physical object crossing over the boundary causes local changes to the visible contrast at the boundary enabling the intruding object to be easily detected by the camera with minimal image processing. An example of an intrusion detection system is presented in PCT/US2015/050353 entitled "Configurable User Detection System."

FIG. 1 shows a simple example of a prior art vision-based intrusion detection system 200. An overhead camera 202, with two adjacent illumination sources 203, 205, looks down at a detection plane 204 at the base of the system. A high contrast boundary pattern 206 representing the intrusion boundary is implemented on the detection plane 204, such as by printing the pattern 206 on the detection plane 204, for example. The boundary pattern 206 can include, for example, an adjacent pair of thin concentric circular arcs, one black and one white, which together provide high optical contrast to any intrusion object that intersects the line-of-sight between the boundary pattern and the camera. When an object of arbitrary color interrupts the direct line-of-sight between the camera 202 and any point on the curved boundary pattern 206, the intrusion will be detected. A dark object crossing the boundary will be detected when it crosses the white portion of the arc because its contrast becomes highly visible to the camera 202. Similarly, a light object will be highlighted by the black arc and mid-tone objects will be highlighted by both arcs.

The lighting of the boundary pattern is normally set up to minimize shadowing; for example, by placing the illumination source(s) closely adjacent to the camera. Typically, the only objective is to provide sufficiently uniform illumination of the boundary pattern 206.

With prior art systems, only objects that are directly observable by the camera 202 can be detected as intrusions. If a potential intrusion object cannot be seen by the camera 202, then it is not detectable by the vision system. Specifically, the object has to be observed crossing the boundary pattern 206. It must interrupt the view of the camera 202 of some segment of the boundary pattern 206 to be detected as an intrusion.

The resulting conical zone 210 of intrusion detection is shown in FIG. 2 for the circular boundary pattern 206 as defined by the configuration of FIG. 1. The zone 210 of intrusion detection is a cone defined by lines radiating from a point at the location of the overhead camera out to points along the circular boundary at the base plane.

The shape of the three-dimensional zone 210 of intrusion detection always shrinks to a point at the location of the camera 202. The zone shape is a cone for the example case of a circular boundary. If the boundary pattern 206 is a rectangle, then the zone shape is a pyramid. In both cases the size of the detection zone reduces linearly with height above the base plane 204. At a distance above the base equal to half of the height of the camera the size of the detection zone 210, its detection range, is reduced by a factor of two. This is a disadvantage since, ideally, the size of the zone 210 would remain fixed as a function of height above the base plane 204. For a circular boundary pattern the ideal zone of intrusion detection would be a cylinder.

The only way to reduce the shrinkage of the detection zone 210 at a particular design height above the base 204 is to increase the height of the camera 202. This is often not practical and only provides limited advantage. Alternatively, additional cameras could be used but this adds cost and complexity to the vision-based intrusion detection system. Also, because the received or captured images from each of the cameras have to be processed in real time to detect the intrusion the resulting image processing burden is multiplied by the number of cameras added. Both options also tend to increase the physical size of the detection system.

OBJECTS AND SUMMARY OF DISCLOSURE

It is the objective of this disclosure to provide a method, for use in conjunction with materials testing or similar application, of expanding the size and shape of the zone of intrusion detection beyond the range at which the camera can see the intrusion object, and to accomplish this without adding more components to the vision-based intrusion detection system. This is accomplished this by intentionally making use of shadows produced by the intrusion object, even when the object cannot be seen by the camera. The illumination source(s) are strategically moved away from the camera location in such a manner as to optimize production of shadows onto the detection boundary when an intrusion intercepts a new expanded zone of detection. By this means an intrusion object is detected both when the camera directly sees it cross a given boundary, as before, and also when the shadow produced by the object crosses a given boundary. The detection of the intrusion is used to deactivate at least a portion of the functions of the materials testing machine and enter a safe mode, in order to enhance the safety of the operator.

BRIEF DESCRIPTION OF THE DRAWINGS

Further objects and advantages of the disclosure will become apparent from the following description and from the accompanying drawings, wherein:

FIGS. 3A and 3B are a perspective view and a front view of an embodiment of the present disclosure, prior to the addition of illumination sources.

FIG. 5 illustrates the intrusion detection zone provided by an embodiment of the present disclosure, illustrating a single illumination source, while omitting illustration of the second illumination source.

DETAILED DESCRIPTION OF THE PREFERRED EMBODIMENT

Figure 1:
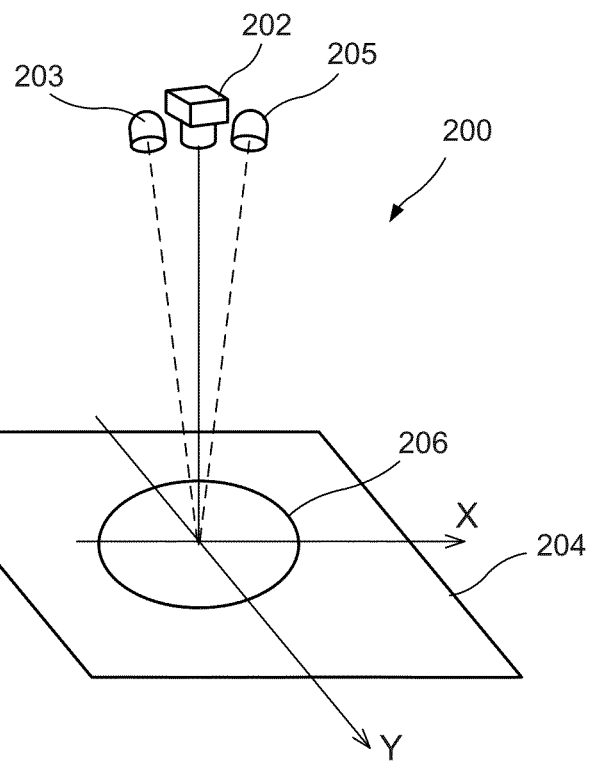
FIG. 1 illustrates a typical prior art video intrusion detection system.
Figure 2:
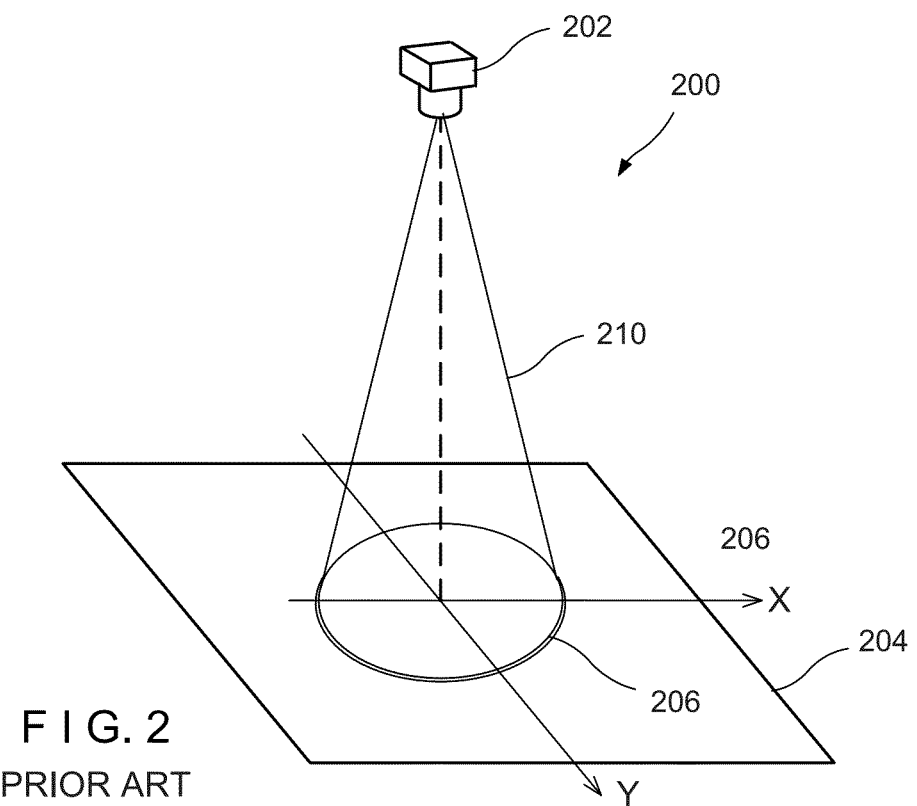
FIG. 2 illustrates a typical prior art conical intrusion detection zone from a single overhead camera.

Referring now to the drawings in detail wherein like numerals indicate like elements throughout the several views, one sees that FIGS. 3A and 3B illustrates the perspective and front view of a tensile testing machine 100 to be protected by an embodiment of the vision-based intrusion detection system of the present disclosure that keeps an operator from harm when the machine is operating, such as performing a materials other tensile test. FIGS. 3A and 3B omit illustration of the illumination sources which are disclosed in subsequent figures. The desired shape of the detection zone 106 is a circular arc around the front of the machine to detect when an operator attempts to reach into the area of the specimen grips (lower grip 102 illustrated). If such an intrusion is detected it shuts down any movements of the crosshead 104 and grips 102.

Figure 4B:
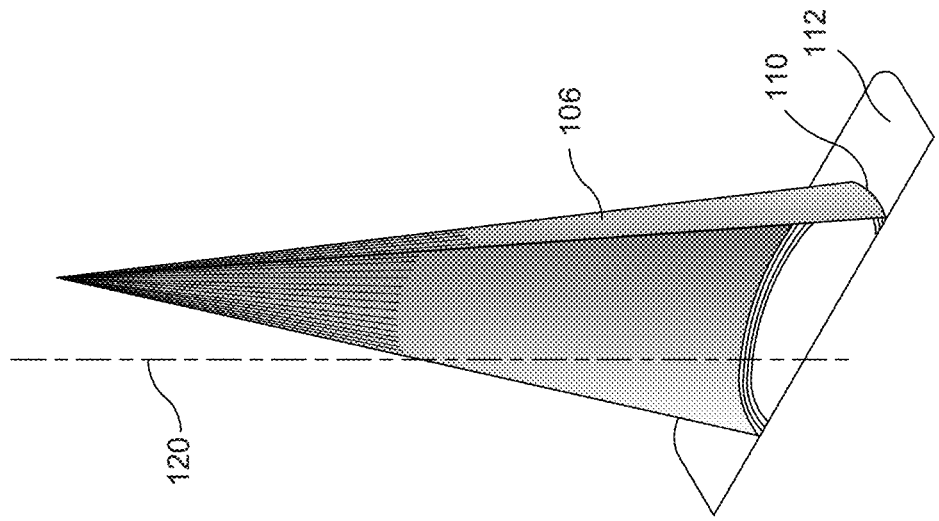
FIGS. 4A and 4B illustrate the zone of detection of the embodiment of FIGS. 3A and 3B of the present disclosure.
Figure 4A:
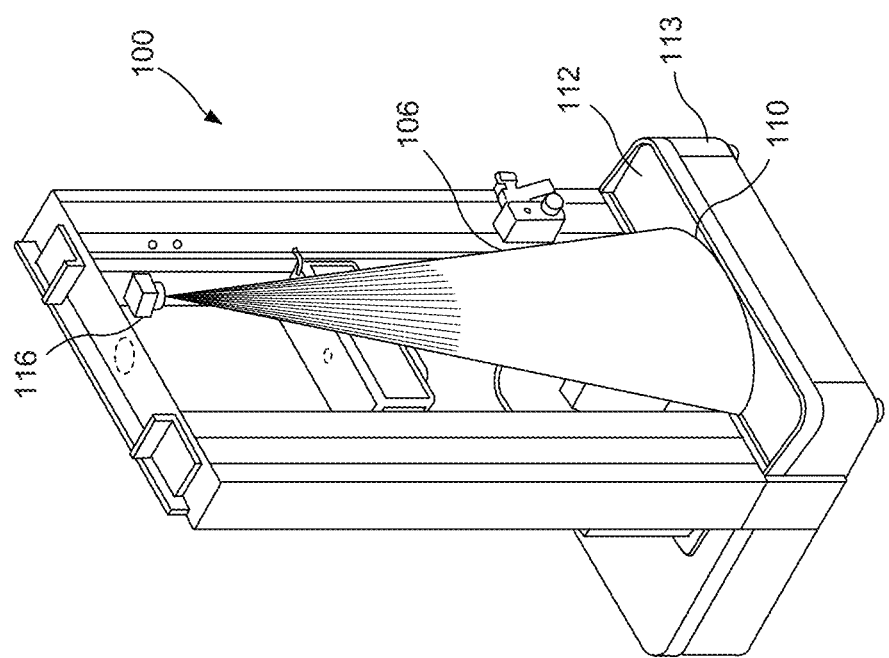

In this case, the contrasting boundary pattern 110 can be circular, semi-circular or elliptical. This pattern 110 is printed on the base pad (rubber mat) 112, which is typically a planar or substantially planar surface, at the base 113 of the machine 100 as shown in FIGS. 4A and 4B. The conical intrusion detection zone 106 shown represents the field of view or three-dimensional intrusion detection boundary that radiates front a point at the camera 116 to the elliptical contrasting boundary pattern 110 printed on the base pad 112. This is the non-enhanced protection zone 106 produced when the intrusion object can be directly seen by the camera 116. Note that the conical intrusion detection zone 106 does not uniformly protect the front of the machine 100. An operator could reach undetected into the load string area 120 (see FIG. 4B) by entering higher up where there is a significant gap between the conical intrusion detection zone 106 and the vertical column of the machine 100.

Shadow Detection

FIG. 5 provides an example of creating an intrusion detection zone based solely on shadow detection. This figure illustrates the structure on the left frame column 122 of the tensile test machine 100 while omitting illustration of the structure on the right frame column 123 in subsequent figures. An infra-red (IR) LED (light emitting diode) illumination source 124 is mounted high on the left frame column 122. A similar infra-red illumination source 125 is illustrated on right frame column 123, as consistent with subsequent figures. While the disclosed embodiment uses infra-red illumination, it is envisioned that other embodiments could use different wavelengths of light, including visible light. The illumination source 124 is mounted against the left frame column 122 and oriented to project a cone 126 of illumination directly down to the base pad 112 containing a thin white elliptical boundary pattern 128. The important rays from the light source 124 are those that directly intercept the white elliptical boundary pattern 128 and illuminate it. These projected rays from the light source 124 form a conical three-dimensional intrusion detection zone 126 as shown. Any opaque intrusion object (such as element 300 in FIG. 5) that intercepts this cone of rays will cast a dark shadow 302 directly on the boundary 128. It will therefore be easily detected by an overhead camera 116 observing the light reflected or scattered from elliptical boundary pattern 128. The location of the shadow 302 on the ellipse is defined by projecting a straight line from the illumination source 124 through the point of intrusion (at 300) and continuing on to the elliptical boundary pattern 128. Note that an intrusion is detected only when an object 300 breaks the rays going directly from the illumination source 124 to the elliptical boundary pattern 128. Shadows cast elsewhere on the pad 112 (supported by base 113 of machines 100) are ignored.

The three-dimensional intrusion detection zone provided by the shadow method shown in FIG. 5 operates completely independent of the direct view of the camera 116 of the object 300. The placement of the illumination sources 124 (and similarly, 125) and the boundary pattern 128 alone define the shadow detection zone. All that is necessary of the camera 116 is to view is the boundary 128 itself. The camera 116 may detect the boundary 128 by detecting light scattered from it or by receiving direct light reflections produced by a more mirror-like boundary pattern 128 that is optimized to point reflected rays from the boundary 128 to the camera 116. In either event, an interruption of illumination rays caused by the shadow of an opaque object will be seen by the camera 116 as a dark segment on an otherwise bright boundary. Simple camera processing of the received or captured image which monitors the profile of light intensity received along the length of the boundary 128 is all that is typically necessary to detect the dark segment produced by the shadow 302. Those skilled in the art, after review of the present disclosure, will recognize a range of equivalent image processing techniques for this method and apparatus.

The placement of the LED illumination source 124 on the left frame column 122 in FIG. 5 provides detection of intrusions by shadow that are not detectable by the direct camera view method of FIGS. 4A and 4B. These include, for example, intrusions close to the columns 122, 123 or high enough from the pad 112 to be unseen by the camera 116. The two methods, intrusion shadow detection and direct camera view of an intrusion object 300, operating together provide a fully enclosed zone of intrusion detection between the left and right frame columns 122, 123 up to a height of approximately 70% of the camera height.

Tensile Test Machine Example with Shadow Detection Method Added

For the example tensile test machine shown in FIGS. 3A, 3B, 4A, 4B and 5, two shadow-based zones of intrusion detection can be added by placing the LED illumination sources 124, 125 on each of the two frame columns 122, 123.

Figure 6B:
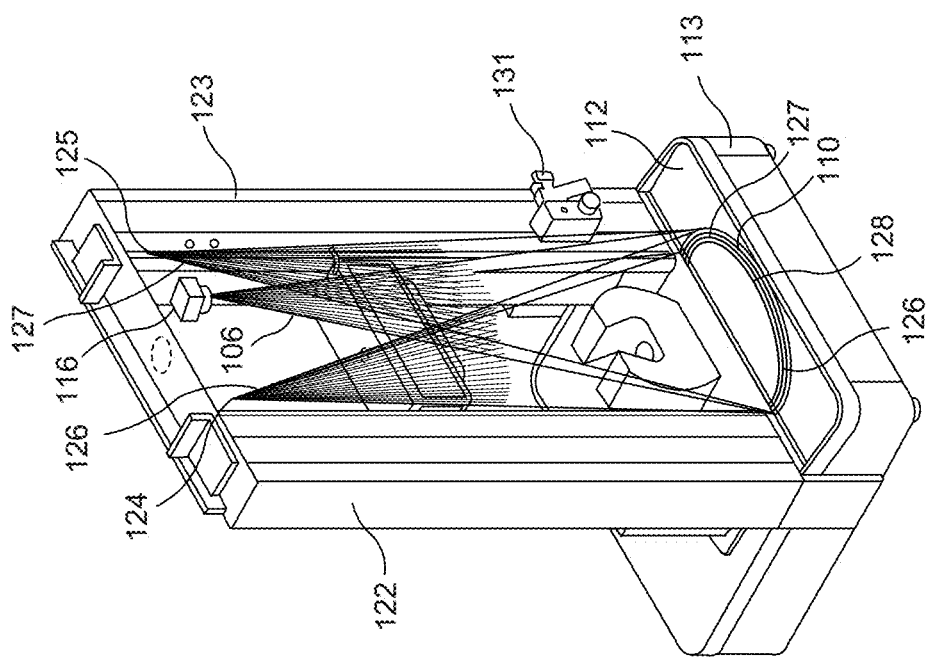
FIGS. 6A and 6B illustrate an enhanced intrusion detection shield using shadow method, including two illumination sources.
Figure 6A:
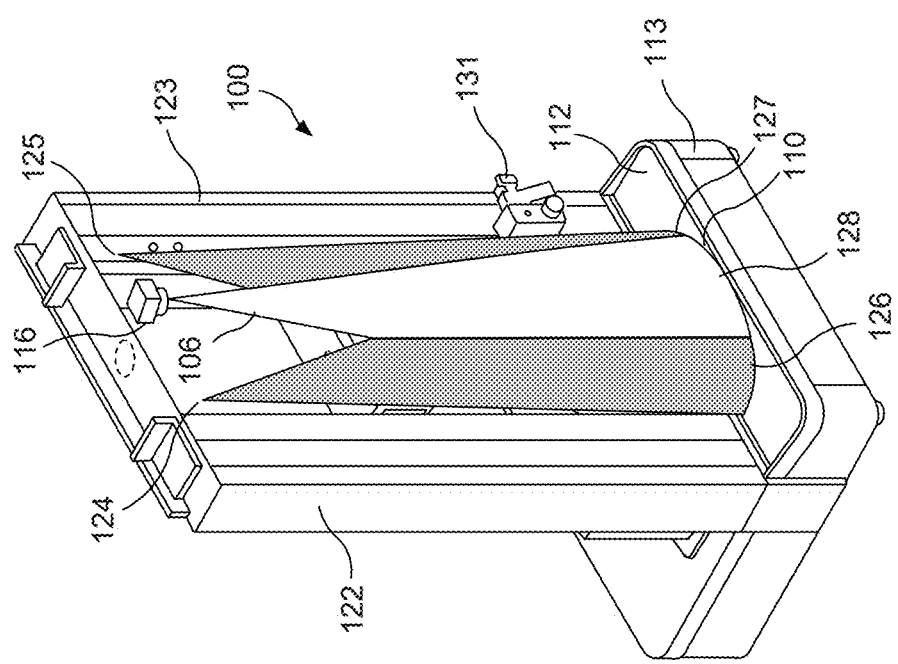

FIGS. 6A and 6B show the enhanced configuration of the same single camera detection system. Here the illumination sources, which are two IR LED illumination sources 124, 125, are positioned away from the camera 116 by placing one on each of the respective columns 122, 123, facing down towards the base pad 112, thereby resulting in respective cones 126, 127. The larger horizontal separation distance between each IR LED 124, 125 and the camera 116 enhances the shadows generated by intrusion objects (see element 300, FIG. 5) by causing them to be projected onto the detection zone of the ellipse when the object itself crosses a new expanded zone of detection. Second column 123 is illustrated including operator panel 131, which may include an indicator light to indicate operation of the disclosed safety system. Due to its use of infra-red LED illumination sources 124, 125, the operation of the disclosed safety system may not be otherwise apparent to an operator.

The camera 116 detects an intrusion object not only by direct view of the object when it is seen, but also by detecting its shadow when the object itself is unseen by the camera 116. That is, the camera 116 can detect an image of an object directly intruding into at least a portion of the field of view of the camera 116 (i.e., third cone 106), and can likewise detect shadows 302 generated by intrusion of the object 300 in the first and second cones 126, 127. The detection of the intrusion, either by detecting the shadow or by directly detecting the intruding object, is used to deactivate at least a portion of the functions of the materials testing machine 100 and place the machine 100 into a safe mode (typically at least including the deactivation of the gripping function of the jaws and movement of the crosshead), in order to enhance the safety of the operator.

Implementation of the shadow method provides a continuous semi-circular shield of protection between the two columns 122, 123 for intrusion heights ranging from the base pad 112 up to the height just before the three cones 106, 126, 127 diverge and no longer intersect each other. The continuous protection zone height is approximately 68% of the height of the camera/LEDs. In this region, there is no longer a gap in three-dimensional intrusion detection zone for the operator to potentially reach through without being detected. Additionally, the size of the three-dimensional intrusion detection zone has been increased by approximately a factor of two.

Figure 7A:
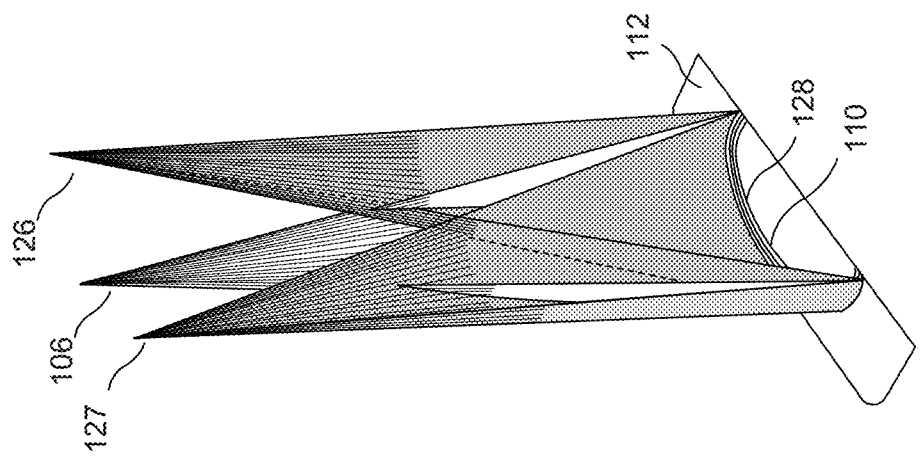
FIGS. 7A and 7B illustrate front and back views of intrusion detection shield: projected cones from 2 LEDs (two lateral cones) and central video camera (central cone).
Figure 7B:
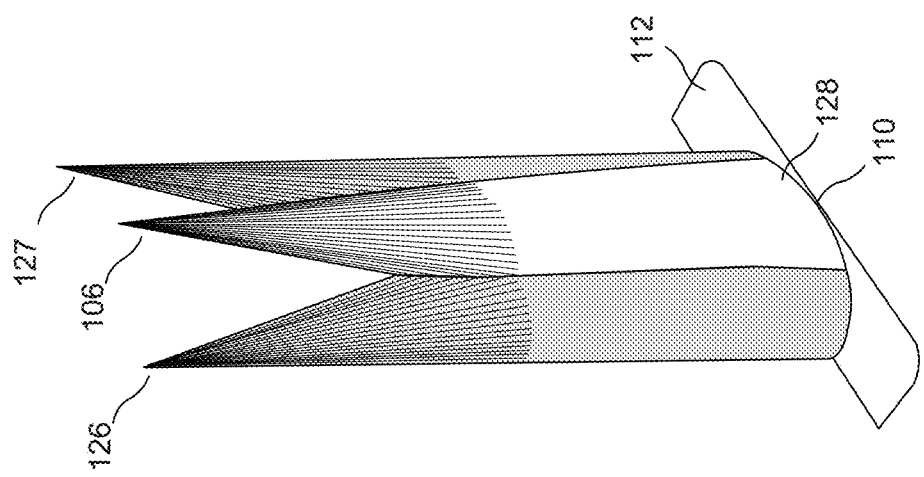

FIGS. 7A and 7B illustrate front and back views of the resultant combined three-dimensional intrusion detection zone. This is illustrated by projecting three cones 106, 126, 127 onto the ellipse of the base pad 112—a central zone 106 from the camera 116, and first and second lateral zones 126, 127 from the IR LED illumination sources 124, 125. The shape of all three cones 106, 126, 127 is defined by the same elliptical pattern 128 printed on the base pad 112 to represent the intrusion boundary. The central cone 106 from the camera 116 represents the three-dimensional detection zone using only a direct view of the intrusion object crossing the elliptical boundary 128. The first and second lateral cones 126, 127 show the additional three-dimensional zones provided by shadow detection resulting from each of the IR LED illumination sources 124, 125. If either lateral cone 126, 127 is intercepted by an intrusion object 300 (see FIG. 5) it will cast a shadow 302 onto the elliptical boundary 128 that will be detected by the camera 116. The shadow 302 is detected the in same manner that a visible dark object is detected crossing the white line of the elliptical boundary 128 on the base pad 112.

An advantage of the shadow method is that there is typically no additional processing of the received or captured image required to add the shadow method since the same elliptical boundary 128 is being monitored for both methods. The detection system does not need to distinguish whether it was a shadow or a directly viewed object that crossed the white boundary. In either event an intrusion has occurred.

Figure 8:
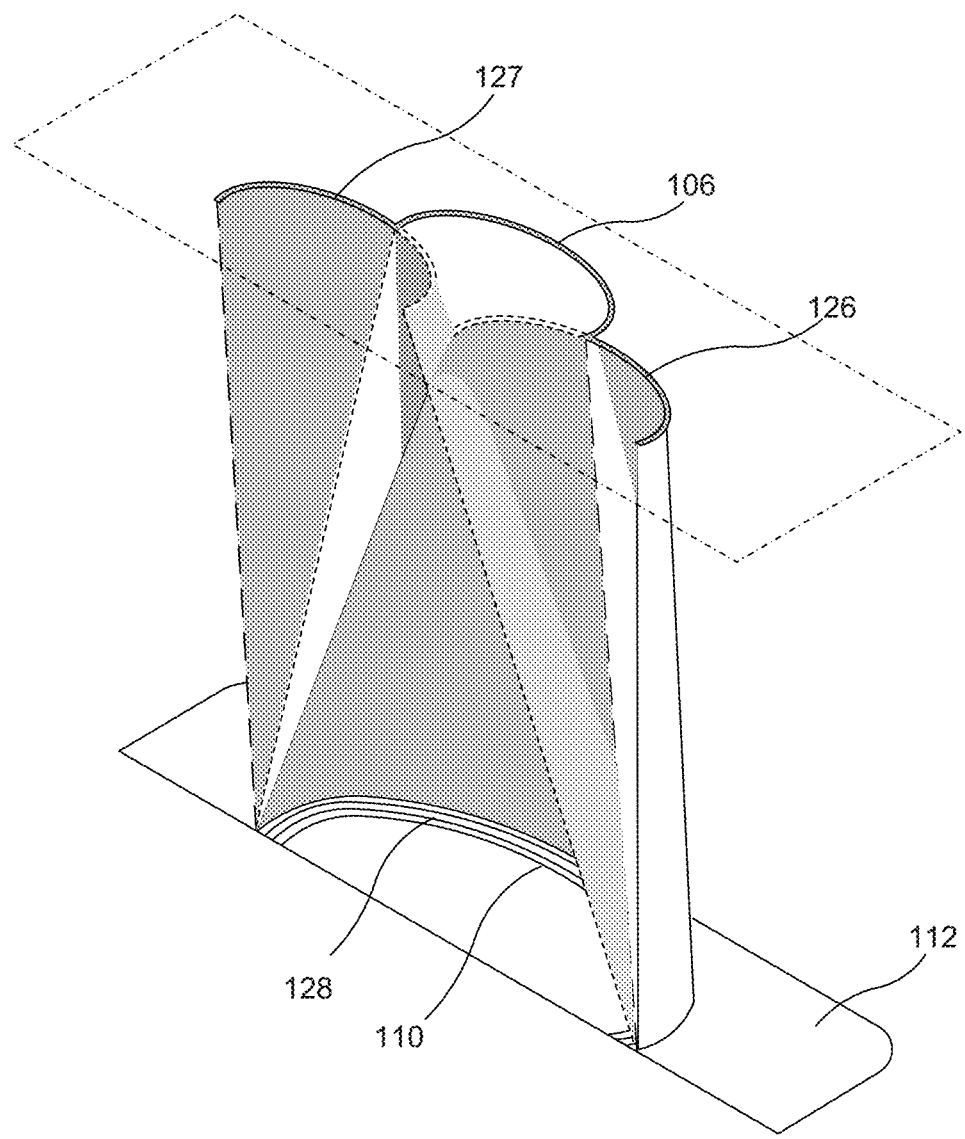
FIG. 8 illustrates a rear view of intrusion detection cones showing common intercept onto ellipse printed on base mat.

FIG. 8 shows a magnified rear view of the three detection cones 106, 126, 127 in FIGS. 7A and 7B. This illustrates the common intercept arc of the cones 106, 126, 127 onto the base pad 112 as well as the high contrast elliptical lines on the base pad 112 that comprise the intrusion detection boundary 128. The view is extended from the base pad 112 up to the maximum height of continuous (i.e., gapless) coverage between the vertical columns 122, 123 of the tensile test machine 100. Any intrusion object 300 (FIG. 5) that intercepts the central cone 106 will be directly observed by the camera 116 as crossing the elliptical boundary 128 and therefore will be detected as an intrusion. Any intrusion object 300 (FIG. 5) that intercepts one of the side or lateral cones 126, 127 will cast a shadow 302 on the elliptical boundary 128 and therefore will be detected as an intrusion which results in the deactivation of a least a portion of the functions of the materials testing machine 100 (such as, but not limited to, the operation of the grips) and enter a safe mode.

The goal is to detect when an intrusion object 300 (FIG. 5) enters from the front of the tensile test machine 100, which is from the right in FIG. 8. Therefore, the full three-dimensional shape of the intrusion detection boundary is represented by the outermost segments of the combined set of cones 106, 126, 127, as viewed from the front. For example, the outline shown on the top cross-section of the combined cones 106, 126, 127 illustrates the outer shape of the shield at that height.

Further Embodiments

The configuration of the shadow method shown for the tensile test machine 100 is only one of many possible embodiments of the disclosure. Other embodiments and variations include:

A. Alternate shape(s) and location(s) for the boundaries.
B. Number and location of illumination sources 124, 125 used for shadow detection.
C. Multiple independent detection boundaries; for example a unique boundary for each illumination source or a different boundary for shadow detection than for direct camera view.
D. Orientation of the key components—illumination sources 124, 125, camera(s) 116 and boundaries 128 can be adjusted to produce an arbitrary shape and orientation of a detection shield.
E. Type of boundary pattern or shape used for either for direct view by camera 116 or for detection of shadows can take many forms:
  1. High contrast marks on a surface—printed, embedded materials or fibers, embossed shapes, retro-reflective tape.
  2. One piece three-dimensional formed reflector, for example to reflect light from a long segment of an illuminated area directly back to the camera 116 in which case the shape of the reflector determines the shape of the boundary line.
  3. A programmable boundary stored in computer memory that evaluates local intensity changes on some surface; the surface may contain some form of regular contrast modulation, such as grid lines for example, to provide the camera with position information necessary implement an arbitrary boundary onto the received or captured image.
  4. To facilitate isolation the of intensity effects produced by a given illuminator, the illumination may be modulated or have a unique wavelength relative to other illumination sources; for example to enable a single camera 116 to determine which illumination source produced the given shadow effect or, for example, to prevent other illumination sources 124, 125 from tending to wash out a shadow 302.

A further variation is to use a three-dimensional formed reflector to define the boundary 128 on the base 113 instead of a patterned two-dimensional pad 112. The reflector would still be relatively thin in the z-axis (the height axis between the target base 113 and the camera 116) and would extend as an arbitrary bent object in the x-y plane of the base 113 to follow the desired shape of the boundary 128. The reflector may be, for example, a narrow segment cut out of a larger three-dimensional ellipsoidal surface volume that encloses both the camera and an illumination source in such a manner that each becomes one of the two focal points of the ellipsoid. In this manner the light from the selected source is always reflected directly back to the camera. The size of the three-dimensional ellipsoid is scaled so that its outer surface coincides roughly with the surface of the base 113 where the boundary 128 is to be located. The formed reflector shape is then defined by a narrow segment of the ellipsoidal surface in the vicinity of the base plane that is cut out to the desired x-y plane shape of the boundary. Generally the z-axis height of the three-dimensional reflector is minimal compared to its x and y axis extents. The z-axis height and surface pointing vector of any point along the top (reflective) surface of the reflector is defined by the ellipsoidal reflector that it was modeled from. If desired, the curvature height of the reflector could be reduced further by modulating the height along reflector length in a stepwise (sawtooth) fashion similar to Fresnel lens design so as to create a nearly flat reflector object.

The result is a highly efficient boundary reflector in which light from a selected source always reflects directly back to the camera from any point along the locus of the boundary line. An important advantage of this method is that it effectively rejects light from all other sources such as: specular or scattered light from non-boundary areas, light from other sources in the system or interference illumination sources. The rejection is due to the high collection efficiency for the selected source compared to the other, non-focused illumination sources.

As in earlier examples, any opaque object that directly blocks a segment of rays from the selected illumination source 124, 125 from reaching the boundary reflector creates a dark shadow on the bright boundary and is easily detected. This is the scenario where the object 300 (FIG. 5) itself is outside of the field of view of the camera 116 and cannot be seen. Likewise, any opaque object 300 (FIG. 5) that intercepts the bright rays reflected from the boundary will create a dark segment in the camera's view of the boundary 128 and therefore will also easily be detected. This is the scenario where the object is within the field of view of the camera 116.

SUMMARY OF DISCLOSED METHOD AND APPARATUS

The disclosed concept uses controlled shadow generation to enhance the performance of a vision based intrusion detection system in a manner that otherwise could only be achieved by adding more video cameras to the system.

A. Increases size/range of intrusion detection zone without the cost and image processing burden of adding more video cameras 116.

B. Enables detection of intrusion objects 300 that are outside of the camera's field of view and therefore not visible to the camera 116.

C. Camera image processing for intrusion detection is minimally affected by incorporating the disclosed embodiment—essentially the same algorithm used for both forms of intrusion detection.

D. Enhancement is achieved primarily with changes only to lower cost passive components; such as the means of implementing a visible boundary pattern.

E. Illumination changes can amount to just changing the location of the illumination source(s) 124, 125.

F. Arbitrary shaped detection zones can be achieved with proper placement of illumination source(s) 124, 125 and camera 116.

G. Method can also be applied to multiple camera vision systems to increase size/range of intrusion detection zone by factors of two or more.

Thus the several aforementioned objects and advantages are most effectively attained. Although preferred embodiments of the invention have been disclosed and described in detail herein, it should be understood that this invention is in no sense limited thereby.

What is claimed is:

1. A system for detection of intruding objects, including:
    a photographic or video device receiving an image from at least a portion of a surface;
    a first illumination device defining a first zone of illumination directed toward the surface thereby defining a first cone and a second illumination device defining a second zone of illumination directed toward the surface thereby defining a second cone;
    wherein the field of view of the photographic or video device defines a third cone;
    wherein the first, second and third cones at least partially intersect on the surface thereby defining an intrusion detection zone; and
    wherein an object intruding into at least a portion of the intrusion zone causes a shadow to be cast on the surface, whereby the shadow is at least a portion of the image being received by the photographic or video device, whereby presence of the object intruding into at least a portion of the intrusion detection zone is detected.

2. The system of claim 1 further including a contrasting boundary pattern on at least a portion of the surface where the first, second and third cones at least partially intersect.

3. The system of claim 1 wherein an image of an object intruding into at least a portion of the field of view of the photographic or video device is received by the photographic or video device, whereby presence of the object intruding into the field of view is detected.

4. The system of claim 1 wherein the first and second illumination sources are infra-red illumination sources.

5. A method for detection of intruding objects, including the steps of:
    providing a photographic or video device receiving an image of at least a portion of a surface;
    providing a first illumination device defining a first zone of illumination directed toward the surface thereby defining a first cone and a second illumination device defining a second zone of illumination directed toward the surface thereby defining a second cone;
    defining a third cone by the field of view of the photographic or video device;
    defining an intrusion zone by at least partial intersection of the first, second and third cones;

detecting an image received by the photographic or video device of a shadow cast on the surface by an object intruding into at least a portion of intrusion detection zone.

6. The method of claim 5 further including the step of providing a contrasting boundary pattern on a portion of the surface wherein the first, second and third cones intersect.

7. The method of claim 4 wherein the step of providing a first illumination device and a second illumination device includes the step of providing a first infra-red illumination source and a second infra-red illumination source.

8. The method of claim 5 further including the step of detecting an image received by the photographic or video device of an object intruding into at least a portion of the field of view of the video or photographic device.

9. A system for materials testing, including:
a materials testing device including an area where material is tested, including a surface proximate to the area where material is tested;
a photographic or video device receiving an image of at least a portion of the surface;
a first illumination device defining a first zone of illumination directed toward the surface thereby defining a first cone and a second illumination device defining a second zone of illumination directed toward the surface thereby defining a second cone;
wherein the field of view of the photographic or video device defines a third cone: wherein the first, second and third cones at least partially intersect on the surface thereby defining an intrusion detection zone; and
wherein an object intruding into at least a portion of the intrusion detection zone causes a shadow to be cast on the surface, whereby the shadow is at least a portion of the image being received by the photographic or video device, whereby presence of the object intruding into at least a portion of the intrusion detection zone is detected and the materials testing device is entered into a safe mode.

10. The system of claim 9 wherein a portion of the surface wherein the first, second and third cones intersect includes a contrasting boundary pattern.

11. The system of claim 9 wherein an object intruding into at least a portion of the field of view of the photographic or video device is detected by the photographic or video device and the materials testing device is entered into a safe mode.

* * * * *